Figure 1:
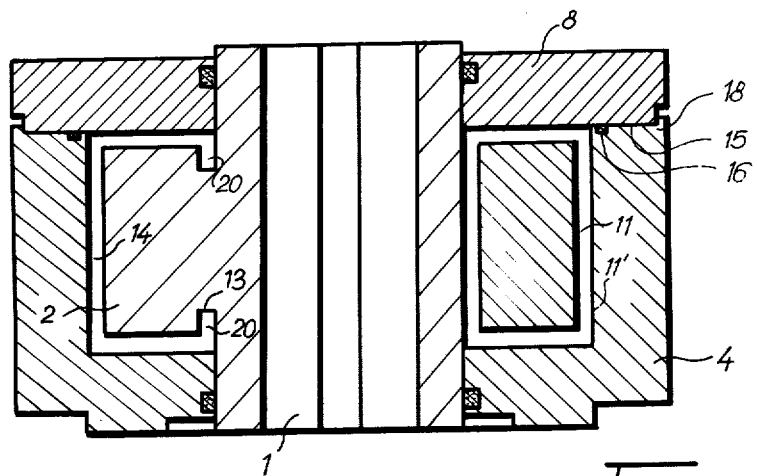

United States Patent [19]
Burda

[11] 3,915,073
[45] Oct. 28, 1975

[54] SEALING MEANS FOR ROTARY SERVO MOTORS

[76] Inventor: Zdenek Burda, No. 8 Gottwaldova, Hlucin, Czechoslovakia

[22] Filed: Oct. 11, 1973

[21] Appl. No.: 405,405

[30] Foreign Application Priority Data
Nov. 20, 1972 Czechoslovakia .............. 7828-72

[52] U.S. Cl. .............................. 92/121; 277/237
[51] Int. Cl. ........................................ F01c 9/00
[58] Field of Search ............... 418/119, 120, 121; 417/481, 482, 483; 92/120, 125, 121; 285/DIG. 19; 251/DIG. 1; 277/237

[56] References Cited
UNITED STATES PATENTS

| | | |
|---|---|---|
| 2,314,683 | 3/1943 | Berry .................................. 251/1 |
| 2,394,364 | 2/1946 | Christensen ......................... 251/1 |
| 2,854,956 | 10/1958 | Hager .................................. 92/121 |
| 2,934,045 | 4/1960 | Shaffer ................................. 92/125 |
| 3,215,046 | 11/1965 | Drake .................................. 92/125 |
| 3,750,535 | 8/1973 | Higuchi ................................ 92/121 |

*Primary Examiner*—Robert I. Smith

[57] ABSTRACT

A system for sealing fluid motors or the like having a vane member oscillatable in a cylindrical housing, enclosed at each end. The vane is provided with a groove running about its peripheral faces, in which a continuous resilient packing having a circular cross section is located. The groove is rectangular in cross section and has a depth less than the comparable dimensions of the packing and a width greater than the comparable dimension of the packing.

13 Claims, 8 Drawing Figures

SEALING MEANS FOR ROTARY SERVO MOTORS

BACKGROUND OF INVENTION

The present invention relates to sealing means for sealing the functional parts of a rotary device. More particularly, the invention relates to sealing means for sealing the working chambers of a fluid rotary servo motor in order to achieve maximum tightness and to increase the service life of the sealing elements.

It is to be understood that the present invention is particularly applicable to hydraulic rotary servo motors although it is equally applicable to other rotary type devices of generally like design. In the interest of simplicity and in order to facilitate understanding of the present invention the invention is disclosed as it is applied particularly to a hydraulic rotary servo motor.

Rotary servo motors are commonly used, amongst other things, for controlling large shut off valves where the closing action is accomplished by turning the closure member by 90° (for example with ball-type valves). Such servo motors generally consist of a vane-type rotor and of a stator comprising a cylindrical casing in which two segment partitions are provided forming hemispherical chambers. The casing may having an integral bottom and a removable cover. If desired, the bottom may also be removable. The rotor consists of a hub portion provided with two oppositely directed vanes. After the rotor is placed inside the cylindrical casing, which forms the stator cavity, the vanes form two pair of oppositely directed working chambers with both segment partitions. Should a pressurized fluid be supplied to one pair of the opposite working chambers, the pressurized fluid causes the vanes of the rotor to rotate in a direction toward the segment partitions. The segment partitions are provided with adjustable stops limiting the rotatability of the rotor. When the second pair of opposite working chambers is supplied with the pressurized fluid the rotor will rotate in the opposite direction, again being limited by adjustable stops provided on the segment partitions.

The servo motor is sealed against loss of fluid to the outside by packings such as O-rings sealing both the upper edges of the rotor against the cover and bottom of the casing as well as sealing the cover itself against the casing. It is furthermore necessary, in order to insure correct and effective functioning of the servo motor that all of the working chambers are sealed against each other, thus obtaining a so-called "internal tightness". This latter sealing is required in:

a. In the plane passing through the axis of rotation of the servo motor and through the stationary segment partitions of the stator, b. In the plane passing through the axis of rotation of the servo motor and through the vanes of the rotor, c. In the cylindrical contact surfaces of the upper edges of the rotor against the cover and the bottom edges of the rotor against the bottom of the stator, d. In the contact surface of the cover against the casing of the stator.

In order to seal the segment partitions in accordance with the point (a) above, a rubber packing of rectangular shape and circular cross section is generally used. This rubber packing is placed inside the grooves of the segment partitions. Since the packing is of integral form and exposed to pressure in the same manner as an O-ring of circular shape and since it is chosen in accordance with the generally accepted principles employed in choosing the sizes and grooves for dynamic O-rings, the sealing is generally reliable.

For sealing the vanes of the rotor following the point (b) above, a packing means is used which is similar to that employed with the segment partitions with the exception however that the packing is not of integral construction. In such case, sealing in the region of anchoring the packing in the vanes of the rotor is rather difficult. In addition, sealing of the cylindrical contact surfaces of both the upper and bottom edges of the rotor against the cover and bottom of the stator following point (c) above, cannot be accomplished properly with good reliability. Leakage can only be reduced by a given amount of choosing the tightest fit, where the O-rings of both of the edges securing only the outer tightness of the servo motor are placed into the chambers as deep as possible. An O-ring seated on the contact surfaces of both the cover and the casing of the stator secures the outer tightness of the servo motor. The internal tightness following point (d) above, must be secured by perfect contact of both the cover and the casing of the stator without any clearance whatsoever. Otherwise the pressurized fluid penetrates from the working chambers into the groove of the O-ring and from that, as through a collecting channel, into the pressureless working chambers. The leakage of the pressurized fluid is generally substantial, since the pressure of the fluid in the circuit is generally very large. Perfect contact of these surfaces by normal constructional arrangements can be achieved only with difficulty due to the limits placed upon it by the size and shape of the servo motor and their methods of manufacture.

The dimensions of the grooves and of the O-rings which fit into them are both standardized and given by the packing or O-ring manufacturer. Generally the principle for determining the dimension of the dynamic O-rings should be followed according to which sufficient space is provided inside the receiving groove, after placement of the dynamic O-ring therein, so that it can roll about following the motion of a piston or piston rod or the rotating vane. However, the rolling about within the groove results in wearing out of the rings on all its peripheral surface and not at one point thereof only. The application of the buff construction with the packing of rectangular shape and circular cross section used to seal the segment partitions and rotor vanes of the servo motors under discussion, becomes disadvantageous due to the extreme torsional load which is exerted on the rubber O-ring. This is especially so at the corners which after a certain period of operation tear and before long finally rupture the packing.

It is an object of the present invention to provide sealing means for a fluid servo motor which overcomes the defects and disadvantages of the prior art.

It is a further object of the present invention to provide a servo motor with sealing means in which leakage between the functional parts is prevented.

It is a further object of the present invention to provide sealing means for a servo motor in which minimizes leakage between the contact surfaces of the casing and the cover.

It is a further specific object of the present invention to provide sealing means for servo motor in which leakage is prevented in the region of the anchoring point of the sealing means.

3

It is a further object of the present invention to provide a servo motor having rotary and stationary members wherein the danger of rupture of the packing means is avoided and in which packing means of rectangular shape and circular cross section, particularly at its corners, may be employed.

It is another object of the present invention to provide packing means for a fluid servo motor having an extremely long service life.

Other objects and advantages of the present invention will be apparent from a consideration of the following description thereof which is to be taken in conjunction with the accompanying drawings.

A BRIEF DESCRIPTION OF THE DRAWINGS

Figure 2:
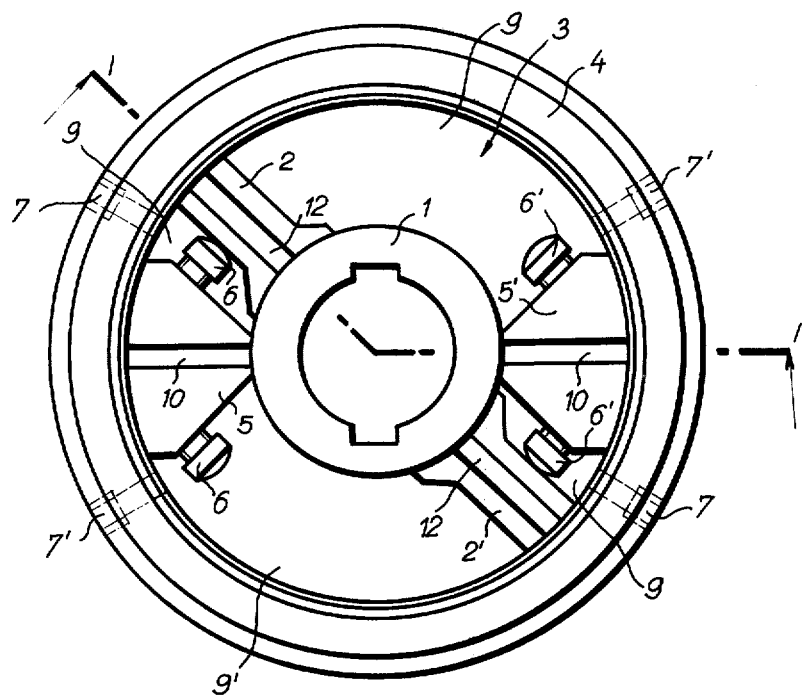
Figure 3:
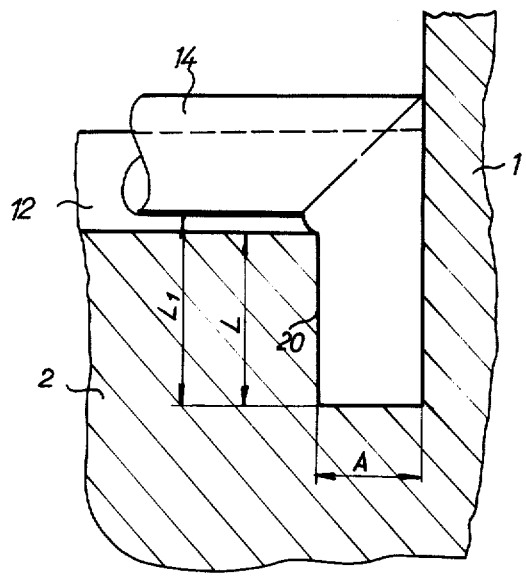
Figure 4:
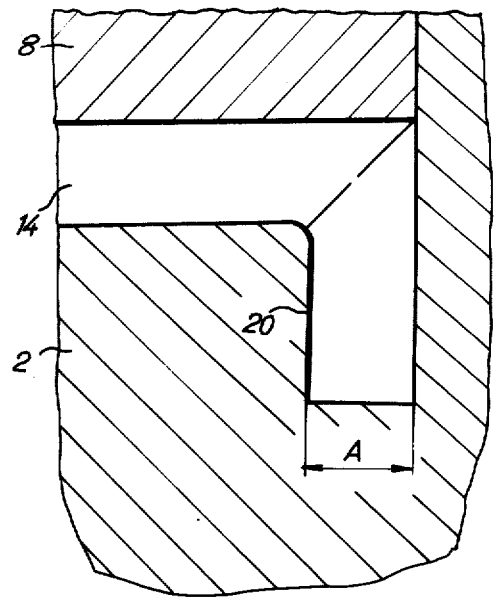
Figure 5:
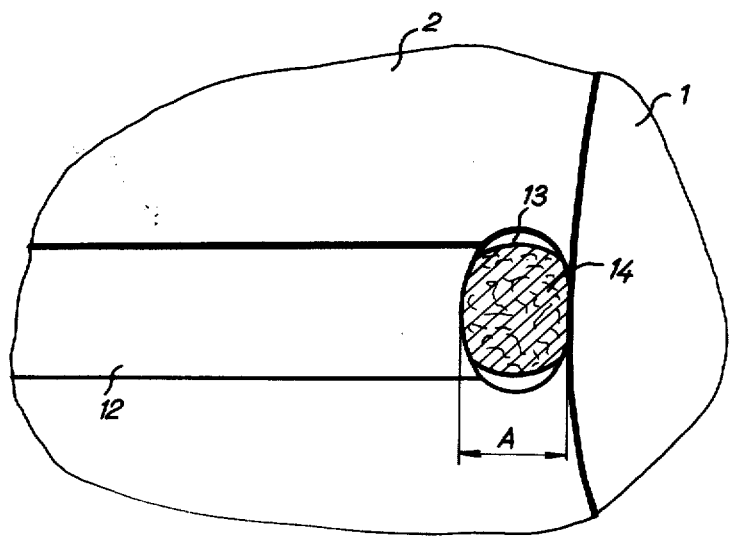
Figure 6:
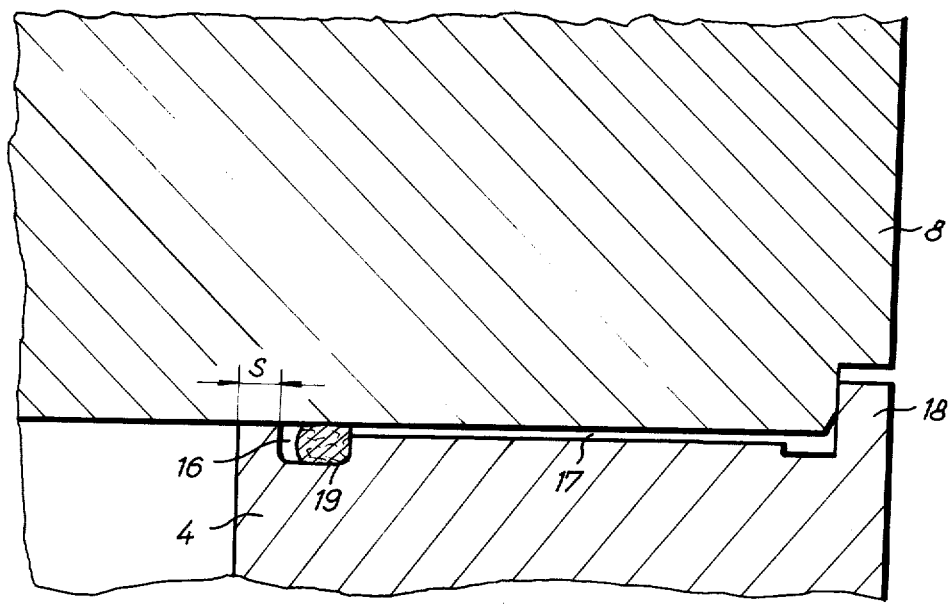
Figure 7:
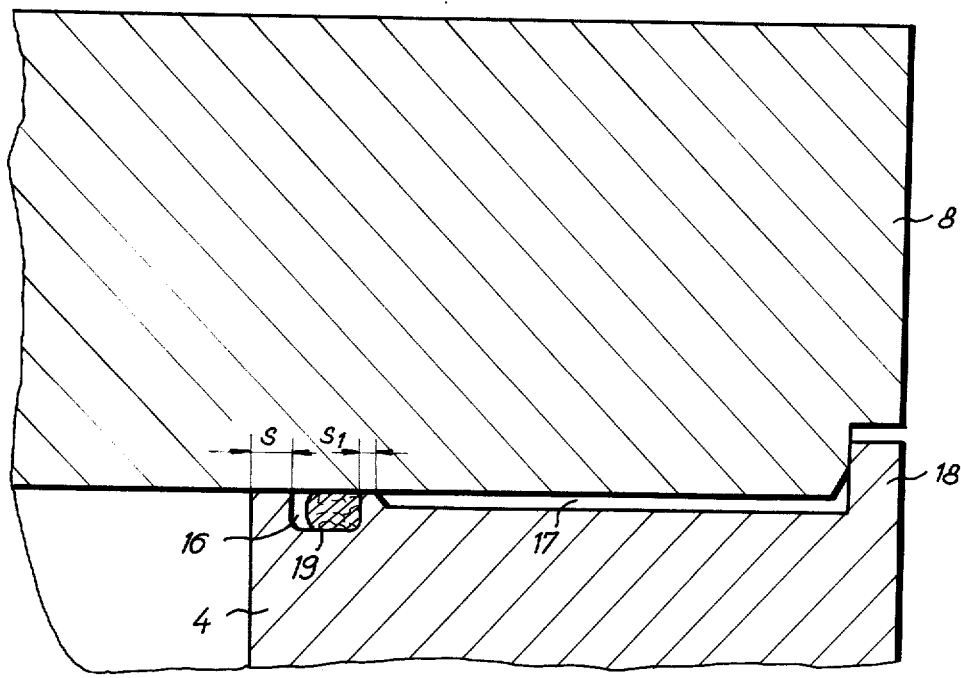
Figure 8:
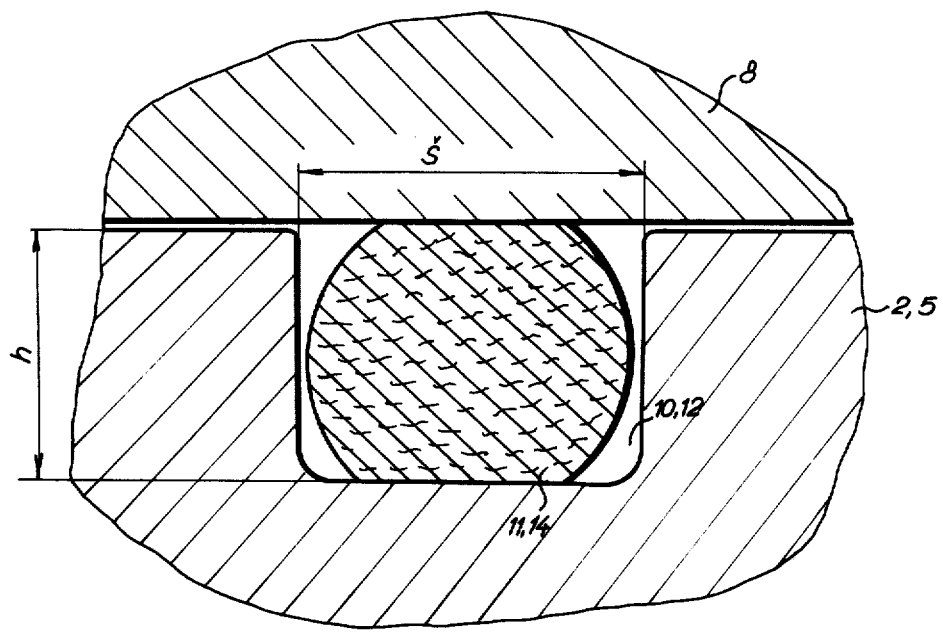

In the drawings:

FIG. 1 is a schematic axial sectional view of a rotary servo motor taken along line 1—1 of FIG. 2, FIG. 2 is a schematic plan view of the servo motor of FIG. 1 showing the general arrangement of the rotor vanes, partition segments, and other functional parts of the servo motor of FIG. 1, FIG. 3 is a schematic sectional view in detail illustrating the O-ring packing anchored in a rotor vane, FIG. 4 is a schematic sectional view in detail illustrating the arrangement of FIG. 3 with the cover included, FIG. 5 is a schematic plan view partially in section illustrating the O-ring packing anchored in the vane of the rotor as illustrated in FIGS. 3 and 4, FIG. 6 is a schematic view in cross section illustrating in detail the sealing means of the invention in its relationship with cover and stator casing, FIG. 7 is a schematic illustration of an alternative embodiment of the invention as illustrated in FIG. 6, and FIG. 8 is a schematic view in section illustrating the O-ring packing inside the groove of both a rotor vane and segment partition.

It is to be understood that the components of a fluid type rotary servo motor are generally well known in this art and are illustrated and described herein only generally and in minimum detail in order to hold the description as brief as possible. The details given are to an extent necessary to facilitate understanding of the present invention.

SUMMARY OF THE INVENTION

In accordance with the present invention a fluid servo motor having cooperating stationary and rotary members is provided with sealing means between said members to prevent the flow of fluid. The sealing means comprise a plurality of integral, continuous and/or split O-rings of rectangular shape and circular cross section which are supported within grooves formed in the functional parts of the servo motor. The cross sectional size of the grooves is greater than the cross sectional size of the O-rings located therein and the depth of the grooves is less than the cross-sectional size of the O-rings located therein.

In general, the outer edges and corners of the O-rings are made in straight lines and perpendicular to each other to conform more closely to the surfaces in which they are in contact with. Preferably, the relationship between the size of the grooves and the O-rings are such that the O-rings can roll within the grooves and that there is a predetermined and predefined relationship therewith.

Full details of the present invention are given in the following description of the preferred embodiments.

DESCRIPTION OF THE PRESENT INVENTION

FIGS. 1 and 2 show schematically a fluid rotary servo motor of the type to which the present invention may be applied. The servo motor comprises a rotor having a central hub 1 provided with a pair of diametrically opposed vanes 2 and 2'. The rotor is located inside a cavity 3 formed by a cylindrical casing 4. A pair of diametrically opposed segment partitions 5 and 5' are attached in a suitable manner to the interior surface of the casing 4. The partitions 5 and 5' are provided with adjustable stops 6 and 6' respectively on each of their opposite faces. The stops may be suitable screw members or bayonet type locking members which can be adjusted at various positions with respect to the segments 5 and 5'. The opposed partitions 5 and 5' extend between the interior surface of the casing 4 and the surface of the hub 1 and thus divide the interior cavity 3 into two semi-circular sections. On the other hand, the vanes 2 and 2' divide each of the semicircular chambers into two smaller chambers, the smaller chambers of one being opposed directly to the smaller chambers of the other. The casing 4 is provided with an integral bottom which is provided with an annular sealing means engaging the surface of the rotor 1 so as to seal against loss of fluid therebetween. The casing is also provided with a removable cover 8 which cover may be fastened by suitable bolts or screw means to the casing. Entering radially through the side wall of the casing 4 are two pair of opposed inlet/outlets 7 and 7' respectively for the introduction and removal of a suitable pressurized fluid media into one or the other of the smaller pairs of opposed chambers formed by the vanes 2 and 2' and 5 and 5' respectively. These smaller chambers being formed into working fluid working chambers 9 and 9' respectively as seen in FIG. 2.

To seal the stationary segment partitions 5 and 5' with respect to the casing 4, the rotor hub 1 and the bottom wall of the casing and the top cover 8, each of the partitions 5 and 5' are provided with an endless peripheral groove 10 of rectangular cross section. Preferably the groove 10 lies in a vertical plane passing through the center of the hub 1. A continuous integral or one piece O-ring 11 having a circular cross section and a rectangular shape is set within the groove 10. The outer surface of the O-ring 11 and its corners 11' form straight lines and are perpendicular to each other. The vanes 2 and 2' are similarly provided about their contact surfaces with the interior wall of the casing 4 and the cover 8 as well as the bottom of the casing 4 with a groove 12 having a rectangular cross section. While the groove 12 extends about the free peripheral surfaces of the vanes 2 and 2' the groove terminates at the hub 1 of the rotor in axially directed oval holes 13 as seen in FIG. 5. Set within each of the grooves 12 is a split O-ring 14 of circular cross section and rectangular shape similar to that of the O-ring 11 except for the fact that it is split. The ends 20 of the O-ring 14 are anchored within the axially directed oval holes 13. The contact edges of the split O-ring 14 are also formed in straight lines with 90° corners and form a rectangular C-shape as seen in FIG. 1.

The upper edge of the casing 4 forms a contact surface 15 with the bottom surface of the cover 8. This contact surface 15 as seen in FIG. 6 is formed with an annular groove 16 of rectangular cross section adjacent its radially inner corner. A shallow annular relief 17 is formed generally along the mid section of the contact surface 15 and ends in an outer upwardly or outwardly extending shoulder 18 which fits within a conforming and cooperating cut out formed in the cover 8. The shoulder 18 acts to center the cover 8. A normal O-ring seal 19 is set within the annular groove 16 in the upper contact surface 15 of the casing 4. An annular O-ring is provided in the radial inner edge of the cover 8 bearing against the surface of the hub 1 of the rotor.

As seen in FIG. 8, the maximum sealing effect of the packing elements or O-rings 11 and 14, employed to seal the stationary partitions 5 and 5' and the vanes 2 and 2' respectively is obtained by forming the diameter of the cross sectional area of the O-rings greater than the depth $h$ of the grooves in which they are located. Thus after the assembly of the servo motor is completed the O-rings are pressed into their respective grooves so as to create a pre-strain or pre-stressing which causes the O-rings to bear against the rotating parts with a sealing effect. The pre-strain is insufficient however to compress the O-ring into a stationary position under the pressures developed by the servo motor itself. Consequently, the width $s$ of the grooves in which the O-ring is seated is provided so that it is itself greater than the maximum width of the cross section of the O-rings after they have been pressed or pre-strained into the groove. Thus the O-ring is free to move sideways. As a result, the action of the pressurized fluid from the servo motor on the side portions of the O-ring forces the O-rings against the rotating parts of the servo motor, by a force representing the sum of the pressure components of the working media and the pre-stress or pre-strain placed upon the O-ring itself. Thus, the maximum sealing effect is achieved. In addition, the wider groove (width $s$) allows the O-rings to roll so that they are worn out along their entire periphery rather than at any given point.

At particular problem may arise with regard to the use of O-rings of this type in the sealing of the vanes 2 and 2'. Since O-rings of rectangular shape with corners made in a straight line so as to bear against the corners of the grooves in which they are set without any clearance are used, this rolling action may cause an excessive load in these corners. Due to torque forces the O-rings may be successively damaged over a period of use and finally rupture. In order to eliminate this disadvantage and to provide maximum service life of the packing elements employed to seal the vanes 2 and 2', reference may be made to the construction shown in FIGS. 3 through 5. Here, the width A of the axial oval holes 13 is made to equal $0.9 \pm 0.05$ of the diameter of the ends 20 of the split O-ring 14 which anchored in the holes 13. The total cross section of the oval holes 13 however is made greater than the cross section of these end parts 20 by a multiple of $1.2 \pm 0.1$ and the length ($L_1$) of the anchored end part 20 is greater than the chosen depth (L) of the oval hole 13 by a multiple of $1.1 \pm 0.05$. This arrangement results in achieving a pre-strain of the O-ring 14 inside the oval hole 13 both in the direction of the width A and axially between the bottom of the oval hole 13 and the cover 8 while permitting the pressurized fluid to freely flow and affect the entire profile of the anchored end 20 by entering within the crescent shaped spaces between the O-ring 14 and the surfaces of the hole 13. The sealing effect thus achieved by such constructional dimensions is perfect and permits the assembly and the replacement of the O-ring in a very simple and effective manner. In FIG. 3 the arrangement is shown without the cover placed on the casing 4 while in FIG. 4 the cover 8 is shown bolted thereon thus stressing and compressing the O-ring as indicated.

In order to achieve the maximum sealing effect between the contact surfaces of the casing 4 and the cover 8 of the servo motor reference is made to the construction shown in FIGS. 6 and 7. As noted earlier, the contact surface 15 of the casing 4 is provided with an annular relief 17 formed between the annular groove 16 and the centering shoulder 18. This results in an annular super-elevation of the contact surface indicated by the letter S which is limited by the inner diameter of the casing 4 and the inner diameter of the groove 16 which receives the O-ring 19. This arrangement enables after assembly of the cover 8 and the casing 4, the achievement of a considerable increase of specific pressure exerted solely upon the narrow contact area S. This results in an increased sealing effect since the entire closing pressure of the cover 8 is directed solely about the radially inner edge of the casing 4. This super-elevation can in the alternative be made on both sides of the annular groove 16 in the manner shown in FIG. 7 wherein a smaller elevated surface $S_1$ is provided. In determining the size of the super-elevated surfaces it is necessary to follow the calculations used to determine the permitted clearances in the case of sealing a piston inside a cylinder by means of a dynamic O-ring, since such calculations are similar in both instances. Moreover, the size of the super-elevated surfaces must not be greater than onen half of the allowed diametric clearance between the piston and cylinder for the O-ring of the chosen cross section (notwithstanding the fact that the described case refers to a static O-ring) in order to prevent the O-ring from being pressed through this clearance under high pressure conditions. It will be appreciated that while the cover 8 and the casing 4 are fixed with regard to each other they bear a relationship as if one were a piston and the other a cylinder. In the alternate embodiment shown in FIG. 7, the width $S_1$ behind the groove 16 is relatively small so as to avoid decreasing the specific pressure on the contact surfaces. The above limitation does not however relate to the height of the supra-elevation or to the depth of the relief 17.

In order to further eliminate the possibility of rupture at the corners of the packing elements or O-rings having a rectangular shape and a circular cross section, the width of the grooves 10 in the segment partitions 5 and 5' and of grooves 12 in the vanes 2 and 2' are reduced an extent at their respective corners such that the packing when assembled cannot possibly roll and such that the pressure fluid can pass between the side walls of the grooves and the compressed packing without any throttling and thus affect the entire functional profile. In order to meet the above conditions the cross section of the groove is preferably greater than the cross section of the packing element by a multiple of $1.25 \pm 0.1$. The depth of the groove for the chosen size of packing cross section is determined in accordance with normal standards for the dimensions of grooves for dynamic O-rings and the width of the grooves is calculated following the above relationship.

By using the above ratios for the sealing elements and the respective grooves, as well as in the manufacture of the relief on the contact surfaces of the parts to be joined, maximum sealing effect may be achieved and a substantial increase in service life of the sealing elements may be obtained. The stated preferred ratios allow the utilization of the sum of pressure components of the pressure fluid and the pre-strain of the sealing elements proper with minimum torsional load in the corners of the sealing elements which are provided with rectangular shape. O-rings made of rubber, synthetic or plastic materials may be used dependent upon the nature of the fluid and other constructional considerations. In referring to dynamic O-ring relationships refers of course to O-rings used in conventional piston cylinder arrangements.

Numerous other advantages of the present invention will be apparent to those skilled in the art. It is to be understood therefore that the invention is not to be limited to the disclosed embodiments and that many variations and embodiments may be obtained without departing from the spirit of the invention. It is further to be understood that the invention is defined in the appended claims.

What is claimed is:

1. In a fluid motor of the like having a cylindrical housing enclosed by transverse end walls, and at least one rectangular vane member oscillatable about a central axis in said housing, a system for sealing said vane member comprising a groove having a rectangular cross section extending continuously around at least the outer and top and bottom faces of said vane member and a continuous resilient packing strip extending throughout said groove, said packing strip having a circular cross section and a rectangular configuration conforming to said vane, said groove having a depth less than the comparable dimension of said packing strip and a width greater than the comparable dimension of said packing strip causing said packing strips to form a rolling pressure seal between the faces of the vane and the adjacent housing.

2. In the fluid motor or the like of claim 1, said system further including a stop member located in said cylinder limiting oscillation of said vane, and sealing means for said stop member comprising a groove having a rectangular cross section extending continuously around at least the outer, top and bottom peripheral faces of said stop member and a resilient packing strip having a circular cross section extending continuously throughout said groove and forming pressure seals between the vane and the walls of the housing said groove having a depth less than the comparable dimension of said packing strip and a width greater than the comparable dimension of said packing strip.

3. In the fluid motor of claim 2 the system being further characterized in that the groove in at least one of said vane and stop members defines a rectangle about the periphery of said vane or stop members and said packing strip conforms in shape thereto, having outer surfaces formed in straight lines and perpendicular corners.

4. In the fluid motor or the like of claim 3, the system being further characterized in that said packing comprises a continuous integral annulus.

5. In the fluid motor or the like of claim 4, the system being further characterized in that said packing strip comprises a split annulus.

6. In the fluid motor or the like of claim 3, the system being further characterized in that the width of the groove in at least one of said vane and stop members is of sufficient size relative to the comparable dimension of said strip to permit said strip to roll within said groove on movement of said members.

7. In the fluid motor or the like of claim 3, the system being further characterized in that the cross sectional width of the groove is greater than the comparable cross sectional dimension of the strip by a multiple of $1.25 \pm 0.1$.

8. In the fluid motor or the like of claim 3, the system being further characterized in that said groove is provided with holes extending axial of its length and the ends of said strip are anchored therein.

9. In the fluid motor or the like of claim 8, the system being further characterized in that said axial holes are oval shaped having a width less than the comparable dimension of said strip.

10. In the fluid motor or the like of claim 8, the system being further characterized in that the width of said axial hole equals $0.9 \pm 0.05$ of the diameter of said steps anchored therein and the total cross sectional size of said holes is greater than the cross section of said strip anchored therein.

11. In the fluid motor or the like of claim 10, the system being further characterized in that the total cross sectional size of said axial hole is greater than the cross section of said strip by a multiple of $1.2 \pm 0.1$ and the length ($L_1$) of the anchored parts of said split O-rings equals $1.1 \pm 0.05$ (L) where L is the depth of said axial holes.

12. A servo-motor or the like having a cylindrical housing enclosed by transverse end walls, at least one rectangular vane member oscillatable about a central axis in said housing, and a system for sealing said vane member comprising a groove having a rectangular cross section extending continuously around at least the outer and top and bottom faces of said vane member and a continuous resilient packing strip extending throughout said groove having a circular cross section and a rectangular configuration conforming to said vane, said groove having a depth less than the comparable dimension of said packing strip and a width greater than the comparable dimension of said packing strip by a multiple of $1.25 \pm 0.1$ to form a rolling pressure seal between the faces of the vane and the adjacent housing walls.

13. The servo motor according to claim 12 wherein said strip comprises a split annular O-ring anchored in axial holes made at contact points of the rotor vanes and the hub supporting said vanes, the width of said axial holes being equal to $0.9 \pm 0.05$ of the diameter of the anchored parts of said strips and the total cross sectional size of the holes is greater than the cross section of said anchored parts of said strip by a multiple of $1.2 \pm 0.1$, the length ($L_1$) of said anchored parts equalling $1.1 \pm 0.05$ (L) where is the depth of the axial holes.

* * * * *

UNITED STATES PATENT AND TRADEMARK OFFICE
CERTIFICATE OF CORRECTION

PATENT NO. : 3,915,073
DATED : October 28, 1975
INVENTOR(S) : Zdenek Burda

It is certified that error appears in the above—identified patent and that said Letters Patent are hereby corrected as shown below:

On the cover sheet of the above Patent the Assignee should be indicated as --

Moravskoslezska Armaturka, narodni podnik
Solni Benesov, Czechoslovakia

Signed and Sealed this tenth Day of February 1976

[SEAL]

Attest:

RUTH C. MASON
*Attesting Officer*

C. MARSHALL DANN
*Commissioner of Patents and Trademarks*